United States Patent
Kesterson

(10) Patent No.: US 9,352,509 B1
(45) Date of Patent: May 31, 2016

(54) TOOLS AND METHODS FOR USE IN REMOVING A COATING

(71) Applicant: The Boeing Company, Chicago, IL (US)

(72) Inventor: Matthew G. Kesterson, Everett, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 13/889,682

(22) Filed: May 8, 2013

(51) Int. Cl.
  *B29C 63/00* (2006.01)

(52) U.S. Cl.
  CPC .................. *B29C 63/0013* (2013.01)

(58) Field of Classification Search
  CPC .............. B23B 5/167; B29C 63/0013
  USPC .......................................... 451/28
  See application file for complete search history.

(56) References Cited

U.S. PATENT DOCUMENTS

| | | | | | |
|---|---|---|---|---|---|
| 2,636,403 | A | * | 4/1953 | Ballard | 408/62 |
| 4,072,441 | A | * | 2/1978 | LaPointe | B23B 51/0426 144/23 |
| 6,475,065 | B1 | * | 11/2002 | Holmes | 451/28 |
| 6,960,121 | B2 | * | 11/2005 | Klink et al. | 451/51 |
| 7,657,984 | B2 | * | 2/2010 | Hopkins et al. | 29/33 R |
| 7,662,026 | B2 | * | 2/2010 | Lewis | 451/28 |
| 2003/0041399 | A1 | * | 3/2003 | Knowles | 15/104.04 |
| 2004/0009737 | A1 | * | 1/2004 | Minegar | 451/28 |
| 2004/0014397 | A1 | * | 1/2004 | Tyldesley | 451/29 |
| 2004/0200018 | A1 | * | 10/2004 | Kadinger et al. | 15/104.04 |
| 2008/0020691 | A1 | * | 1/2008 | Kuebler | 451/548 |
| 2010/0048109 | A1 | * | 2/2010 | King et al. | 451/356 |
| 2011/0311730 | A1 | * | 12/2011 | Atsebha et al. | B05C 17/00503 427/421.1 |
| 2012/0009032 | A1 | * | 1/2012 | Grussenmeyer | B23B 51/0426 408/204 |
| 2012/0237306 | A1 | * | 9/2012 | Naughton | B23B 51/0426 408/82 |
| 2013/0279999 | A1 | * | 10/2013 | Polizzi | 408/203.5 |
| 2013/0291386 | A1 | * | 11/2013 | Gambino et al. | 30/95 |
| 2014/0017021 | A1 | * | 1/2014 | Bellino et al. | 408/203.5 |
| 2014/0261956 | A1 | * | 9/2014 | Wiseman et al. | 156/60 |
| 2015/0104998 | A1 | * | 4/2015 | Fuller | 451/28 |

FOREIGN PATENT DOCUMENTS

WO   WO 2013/036235   *   3/2013   ............. B25B 5/167

OTHER PUBLICATIONS

Lexan Polycarbonate—Material Product Data Sheet—Jun. 18, 2002.*

SR Cutter & SR Radial Bristle Discs for Seam Sealant Removal, Product Brochure, 3M Abrasive Systems Organization, St Paul, MN, 2002.

* cited by examiner

*Primary Examiner* — Joseph J Hail
*Assistant Examiner* — Marc Carlson
(74) *Attorney, Agent, or Firm* — Armstrong Teasdale LLP

(57) ABSTRACT

A tool for removing a coating from at least one of a surface and a fastener head that is generally flush with the surface is provided. The tool includes a first scraper configured to abrasively engage the coating on at least one of the surface and the fastener head and a second scraper sized to abrasively engage the coating in a recess in the fastener head. The first scraper is rotatable relative to the fastener head and the second scraper is rotatable within the recess. The first scraper and the second scraper are translatable relative to each other.

20 Claims, 3 Drawing Sheets

TOOLS AND METHODS FOR USE IN REMOVING A COATING

BACKGROUND

The present disclosure relates generally to tools and, more specifically, to tools for use in removing coatings.

At least some known aircraft assemblies are constructed using fasteners for interconnecting components thereof. Coatings, such as paints, may be applied over the components and the fasteners to improve the aesthetic appearance of the aircraft and/or to protect the assemblies from damage and deterioration. At least some known aircraft assemblies include panels that may be removable for purposes of maintenance and/or repair. However, the coatings mentioned above may prevent effective tool engagement with the fasteners retaining the panels, and may also make it difficult to remove the fasteners from the service panels without introducing cosmetic flaws thereto.

One known method of extracting the service-panel fasteners used with service panels is to remove paint from the recesses in the fastener heads with a sharp tool, such as a pick, and then to break the fasteners loose using an impact wrench. However, extracting the fastener in this manner may damage the paint on the surface of the panel creating a rough edge around the fastener head. As such, the coating may need to be repaired prior to the service panel being re-installed in the aircraft assembly. Accordingly, removing fasteners in the above-described manner may be an inefficient and time-consuming process.

BRIEF DESCRIPTION

In one aspect, a tool for use in removing a coating from at least one of a surface and a fastener head that is generally flush with the surface is provided. The tool includes a first scraper configured to abrasively engage the coating on at least one of the surface and the fastener head and a second scraper sized to abrasively engage the coating in a recess in the fastener head. The first scraper is rotatable relative to the fastener head and the second scraper is rotatable within the recess. The first scraper and the second scraper are translatable relative to each other.

In another aspect, a method for use in removing a coating from at least one of a surface and a fastener head that is generally flush with the surface is provided. The method includes selecting a first scraper to abrasively engage the coating on at least one of the surface and the fastener head and selecting a second scraper to be undersized for insertion in a recess in the fastener head to abrasively engage the coating in the recess. The first scraper and the second scraper are translatable relative to each other. The method also includes inserting the second scraper into the recess with a clearance fit, biasing the first scraper against the coating, and rotating the first scraper and the second scraper.

DETAILED DESCRIPTION

The present disclosure relates to tools and methods for use in removing a coating from at least one of a surface and a fastener head that is generally flush with the surface. In the exemplary implementation, the tool includes a first scraper that abrasively engages the coating on either one of the surface and/or the fastener head, and a second scraper that abrasively engages the coating in a recess in the fastener head. In one exemplary implementation, the first scraper is rotatable relative to the fastener head and the second scraper is rotatable within the recess to facilitate removing the coating therefrom. Further, in some implementations, either one of the first scraper and/or the second scraper may be selectively biased to maintain abrasive engagement with the coating as it is removed, and/or selectively biased to account for variances in depths of the recess and/or thicknesses of the coating. As such, the tools and methods described herein facilitate removal of coatings from surfaces of panels and/or fastener heads that are generally flush with the surfaces to enable the fasteners to be removed from the panels.

Figure 1:
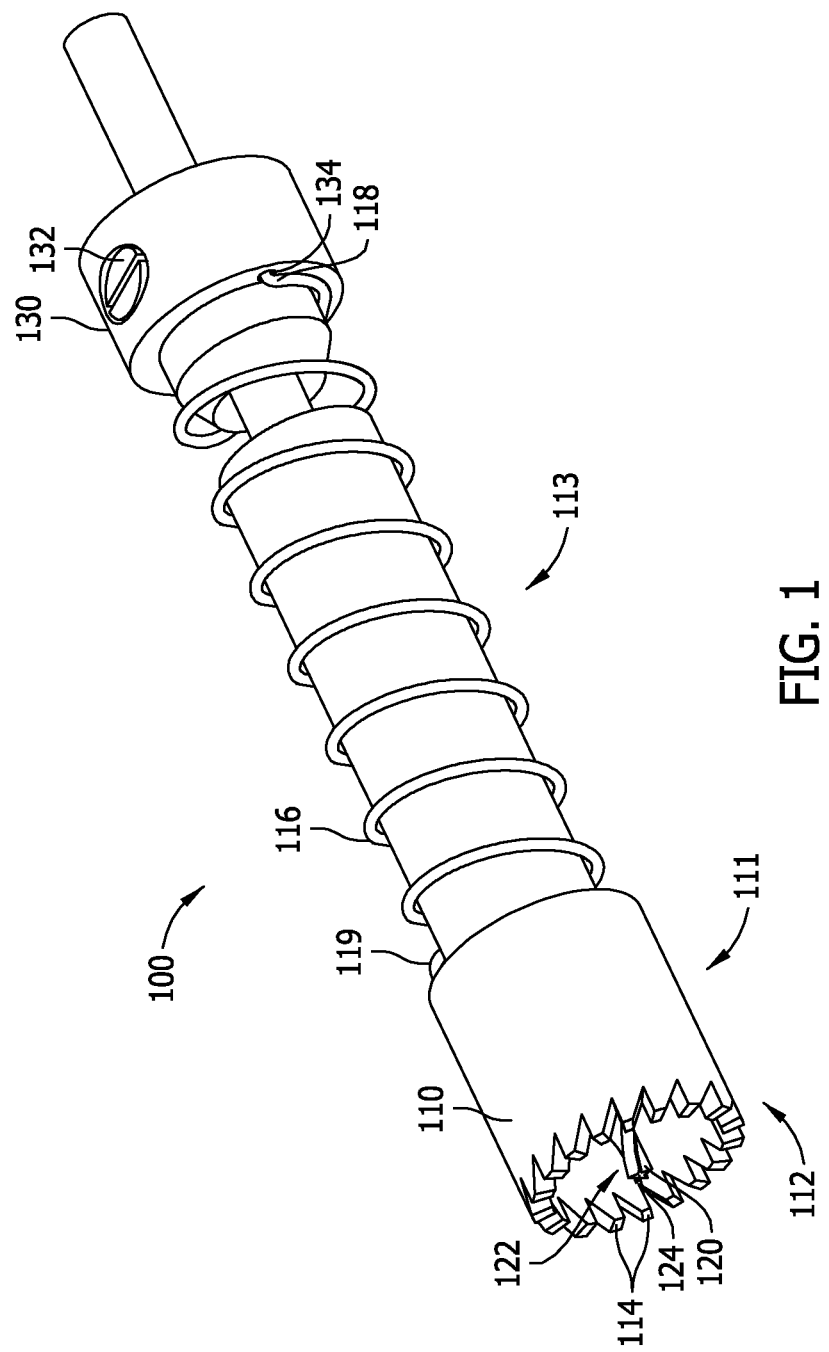
FIG. 1 is a perspective view of an exemplary tool that may be used to remove a coating.
Figure 2:
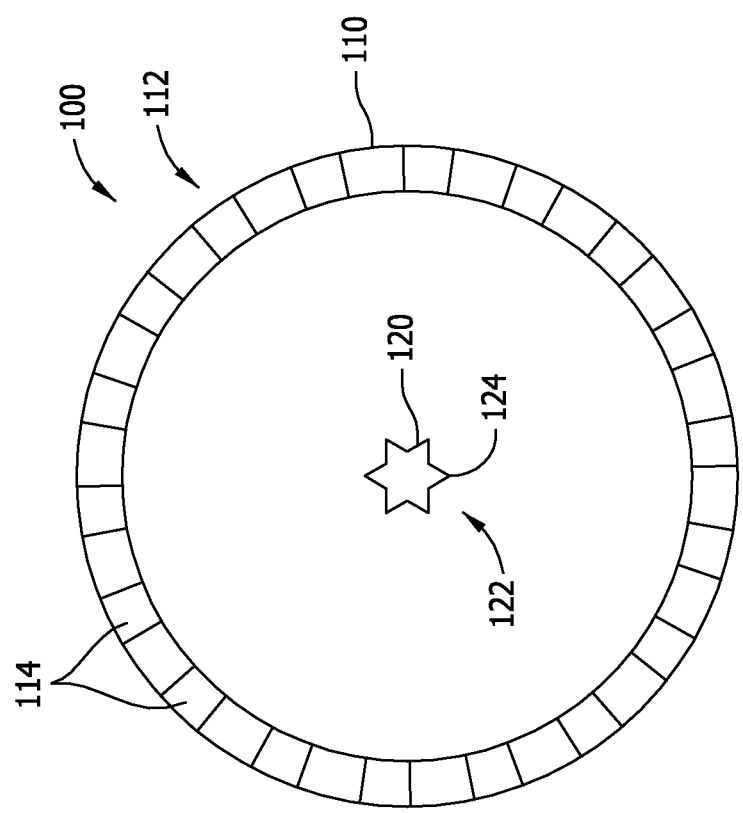
FIG. 2 is a schematic front view of the tool shown in FIG. 1.
Figure 3:
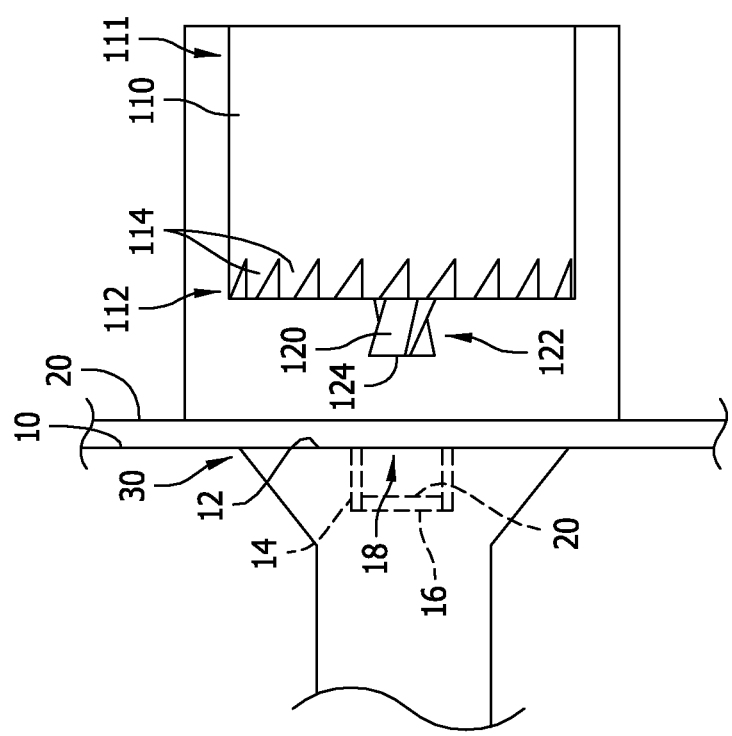
FIG. 3 is a side view of a portion of the tool, shown in FIG. 1, positioned relative to an exemplary fastener head and surface.

FIGS. 1-3 are views of an exemplary tool 100 for removing a coating 20 from at least one of a surface 10 and a fastener head 12 that is generally flush with surface 10. In an exemplary implementation, tool 100 includes a first scraper 110 and a second scraper 120. First scraper 110 is configured to abrasively engage coating 20 on at least one of surface 10 and fastener head 12, and is rotatable relative to fastener head 12. Second scraper 120 is sized to abrasively engage coating 20 in a recess 14 in fastener head 12 and is rotatable within recess 14. First scraper 110 and second scraper 120 are translatable relative to each other.

In some implementations, tool 100 facilitates reducing abrasion of surface 10 during operation. For example, in some implementations, first scraper 110 may be made of a softer material than the material of surface 10. First scraper 110 may be made of any material that enables tool 100 to function as described herein. In some implementations, surface 10 includes a composite material and first scraper 110 is made of a material that is softer than the composite material. For example, an exemplary first scraper 110 may be made of, but is not limited to, a polymeric material. In the exemplary implementation, the polymeric material has a Shore D hardness between about 70 and about 90, and more specifically a Shore D hardness of about 85, when measured on the ASTMD 2240 Type D Scale (2010). In some implementations, first scraper 110 is made of a polyetherimide material (PEI).

First scraper 110 may have any shape that enables tool 100 to function as described herein. For example, in an exemplary implementation, first scraper 110 is substantially concentric with second scraper 120 and second scraper 120 is nested within first scraper 110. First scraper 110 has a front portion 111 and a rear portion 113 that has a smaller outer diameter than front portion 111. Front portion 111 of first scraper 110 also includes an abrasive end 112 and a plurality of abrasive elements 114 that extend from abrasive end 112. Abrasive elements 114 may have any shape and number that enables removal of coating 20, and may be positioned about abrasive end 112 with any spacing that enables coating 20 to be removed from surface 10 and/or fastener head 12. In an exemplary implementation, abrasive elements 114 may comprise teeth.

In an exemplary implementation, second scraper 120 is undersized for rotational insertion into recess 14, which may take the form a torx pattern, a star-shaped pattern, a hexagonal pattern, an a square pattern, for example. Further, second scraper 120 includes an abrasive end 122 with abrasive elements 124. Abrasive elements 124 may have any shape and number that enables removal of coating 20, and abrasive elements 124 may be positioned about abrasive end 122 with any spacing or lack thereof that enables coating 20 to be removed from recess 14. In an alternative implementation, abrasive elements 124 may include cutting edges such as those of a drill bit and/or a milling cutter. In some implementations, second scraper 120 is undersized by at least about 0.005 inch (in) (0.127 millimeter (mm)) with respect to recess 14. As such, undersizing second scraper 120 facilitates reducing stripping of the recess pattern when second scraper 120 is rotated therein.

Second scraper 120 may be made of any material that enables tool 100 to function as described herein. Exemplary materials that may be used to make second scraper 120 include, but are not limited to, a metallic material, and a polymeric material. As used herein, the term "metallic" may refer to a single metallic material or a metallic alloy material. In some implementations, second scraper 120 may be made of high-speed tool steel material, for example.

In an exemplary implementation, first scraper 110 and second scraper 120 are rotationally coupled. More specifically, first scraper 110 and second scraper 120 are rotationally coupled via an arrangement of mating features. As used herein, the terms "rotationally coupled", "rotationally couple", and/or "rotationally coupling" mean substantially limiting relative rotation between objects such as first scraper 110 and second scraper 120. For example, in some implementations, a spring 116 is used to rotationally couple first scraper 110 and second scraper 120, thereby limiting relative rotation therebetween even though there may be a lag in rotational coupling caused by the wind-up of spring 116. Further, rotating either first scraper 110 or second scraper 120 imparts rotation to the other scraper because first scraper 110 and second scraper 120 are rotationally coupled.

In an exemplary implementation, the arrangement of mating features includes a stop collar 130 attached to second scraper 120 in a fixed orientation using a fastener such as a set screw 132. Further, first scraper 110 is rotationally coupled to stop collar 130 via spring 116 that extends along rear portion 113 of first scraper 110 between front portion 111 and stop collar 130. In some implementations, the diameters of either front portion 111 and/or stop collar 130 may be greater than a diameter of spring 116. In an exemplary implementation, one end 118 of spring 116 may engage a corresponding opening 134 formed in stop collar 130, and another end 119 of spring 116 may engage a corresponding opening (not shown) formed in front portion 111 of first scraper 110. In an alternative implementation, the arrangement of mating features may include at least one of a spline, a set screw, a flat surface, a depression, and a protuberance.

As described above, first scraper 110 and second scraper 120 are translatable relative to each other. In an exemplary implementation, tool 100 includes means for selectively biasing first scraper 110 relative to second scraper 120, e.g., spring 116. As used herein, the term "selectively biasing" means forcing and/or urging either first scraper 110 and/or second scraper 120 into abrasive engagement with coating 20 when the other scraper is engaged therewith. For example, in one implementation, first scraper 110 is selectively biased into abrasive engagement with coating 20 when second scraper 120 is fully inserted within recess 14. In the exemplary implementation, fully inserting second scraper 120 into recess 14 facilitates compressing spring 116 located between stop collar 130 and abrasive end 112, and facilitates forcing and/or urging first scraper 110 into abrasive engagement with coating 20. In some implementations, spring 116 may have a spring rate between about 7.5 pounds per inch (lb/in) and about 30 lb/in.

FIG. 3 is an enlarged side view of tool 100 relative to an exemplary fastener head 12. As described above, first scraper 110 is configured to abrasively engage coating 20 on at least one of surface 10 and fastener head 12, and second scraper 120 is sized to abrasively engage coating 20 in recess 14 in fastener head 12. Further, first scraper 110 has any size that enables tool 100 to function as described herein. For example, in some implementations, first scraper 110 is sized to radially extend to an interface 30 between surface 10 and fastener head 12 to abrasively engage coating 20 on fastener head 12. Alternatively, first scraper 110 may be sized to extend beyond interface 30 to abrasively engage coating 20 on surface 10. In yet another aspect, first scraper 110 may be sized to extend beyond interface 30 to abrasively engage coating 20 on surface 10 and fastener head 20. As used herein, the term "surface" refers to the surface adjacent to fastener head 12 such as the surface of an aircraft panel, for example.

A method of removing coating 20 from at least one of surface 10 and fastener head 12 that is generally flush with surface 10 is also provided herein. The method includes selecting first scraper 110 to abrasively engage coating 20 on at least one of surface 10 and fastener head 12. Selecting first scraper 110 also includes selecting first scraper 110 made of a material that is softer than a material of surface 10. The method also includes selecting second scraper 120 to be undersized for insertion in recess 14 in fastener head 12 to abrasively engage coating 20 in recess 14, wherein first scraper 110 and second scraper 120 are translatable relative to each other.

In the exemplary implementation, the method also includes inserting second scraper 120 into recess 14 with a clearance fit, biasing first scraper 110 against coating 20, and rotating first scraper 110 and second scraper 120. In some implementations, biasing first scraper 110 comprises urging first scraper 110 by spring 116 that has a spring rate of between about 7.5 lb/in and 30 lb/in. As such, biasing first scraper 110 comprises maintaining abrasive engagement of first scraper 110 again coating 20 as coating 20 is removed from at least one of surface 10 and fastener head 12. Further, in some implementations, inserting second scraper 120 comprises aligning first scraper 110 with at least one of surface 10 and fastener head 12 when second scraper 120 is inserted into recess 14, and rotating second scraper 120 comprises removing coating 20 from surface 16 of recess 14 that opposes an open end 18 thereof.

In some implementations, the method includes rotationally coupling first scraper 110 and second scraper 120. More specifically, rotationally coupling first scraper 110 and second scraper 120 comprises mating first scraper 110 and stop collar 130 via an arrangement of mating features, and/or affixing stop collar 130 to second scraper 120 and rotationally coupling first scraper 110 and stop collar 130. In the exemplary implementation, spring 116 is used to rotationally couple first scraper 110 and stop collar 130, and rotationally coupling first scraper 110 and stop collar 130 comprises coupling one end 118 of spring 116 with stop collar 130 and another end 119 with first scraper 110.

In some implementations, the method comprises configuring at least one of first scraper 110 and second scraper 120 to be operable for engagement with a power tool (not shown), and operating the power tool to rotate first scraper 110 and second scraper 120. More specifically, in the exemplary implementation, second scraper 120 is configured to be operated with the power tool by being sized for insertion in a chuck (not shown) of the power tool. Further, in the exemplary implementation, first scraper 110 may be rotated by power tool by being rotationally coupled to second scraper

120. In an alternative implementation, first scraper 110 may be sized for insertion in the chuck, and rotation may be induced to second scraper 120 by rotationally coupling second scraper 120 and first scraper 110.

The tools and associated methods described herein enable a coating to be removed from at least one of a surface and a fastener head that is generally flush with the surface to facilitate removal of the fastener from the surface. More specifically, the tools described herein include first and second scrapers that facilitate removing the coating at and/or beyond an interface between the fastener head and the surface, and from within a recess in the fastener head. In some implementations, the first scraper and the second scraper are translatable relative to each other and may be selectively biased to ensure abrasive engagement with the coating as the coating is removed. Further, the first scraper may be made of material that facilitates reducing abrasion of the surface should the first scraper contact the surface as the coating is removed therefrom. As such, the tools and methods described herein facilitate reducing the time and effort required to remove fasteners that have a coating deposited thereon, and facilitate minimizing damage to the surface during such coating removal.

This disclosure uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tool for use in removing a coating from at least one of a surface and a fastener head recessed within the surface and having an outer face that is generally flush with the surface, the tool comprising:
   a first scraper configured to abrasively engage the coating on at least one of the surface and the outer face of the fastener head, wherein the first scraper is rotatable relative to the fastener head; and
   a second scraper sized to abrasively engage the coating in a recess in the fastener head, wherein the second scraper is rotatable within the recess; and
   a spring configured to bias an abrasive end of the first scraper away from a trailing end of the second scraper and against the at least one of the surface and the outer face of the fastener head as an abrasive end of the second scraper engages the coating in the recess.

2. The tool in accordance with claim 1, wherein the second scraper is undersized with respect to the recess by at least about 0.01 inch.

3. The tool in accordance with claim 1, wherein the first scraper is substantially concentric with the second scraper when the second scraper is nested within the first scraper.

4. The tool in accordance with claim 1, wherein the first scraper comprises a plurality of abrasive elements that extend from the abrasive end.

5. The tool in accordance with claim 1, wherein the first scraper is sized to radially extend to an interface between the surface and the fastener head to abrasively engage the coating on the outer face of the fastener head.

6. The tool in accordance with claim 1, wherein the first scraper is sized to radially extend beyond an interface between the surface and the fastener head to abrasively engage the coating on the surface.

7. The tool in accordance with claim 6, wherein the first scraper is sized to radially extend beyond the interface to abrasively engage the coating on the surface and the outer face of the fastener head.

8. The tool in accordance with claim 1, wherein the first scraper and the second scraper are rotationally coupled via an arrangement of mating features.

9. The tool in accordance with claim 8, wherein the arrangement of mating features comprises a stop collar attached to the second scraper, wherein the first scraper is rotationally coupled to the stop collar via the biasing device.

10. The tool in accordance with claim 1, wherein the surface comprises a composite material and the first scraper is made of a material that is softer than the composite material.

11. The tool in accordance with claim 10, wherein the first scraper is made of a polymeric material having a Shore D hardness between about 70 and about 90.

12. The tool in accordance with claim 1, wherein the second scraper is made of at least one of a metallic material and a polymeric material.

13. The tool in accordance with claim 1, wherein the second scraper comprises an abrasive end having a flat end face for abrasively engaging the coating.

14. A method for use in removing a coating from at least one of a surface and a fastener head that is generally flush with the surface, the method comprising:
   selecting a first scraper to abrasively engage the coating on at least one of the surface and the fastener head;
   selecting a second scraper to be undersized for insertion in a recess in the fastener head to abrasively engage the coating in the recess, wherein the first scraper and the second scraper are translatable relative to each other;
   inserting the second scraper into the recess with a clearance fit;
   biasing the first scraper against the coating as the second scraper engages the coating in the recess; and
   rotating the first scraper and the second scraper.

15. The method in accordance with claim 14, wherein inserting the second scraper comprises aligning the first scraper with the at least one of the surface and the fastener head when the second scraper is inserted into the recess.

16. The method in accordance with claim 14, wherein biasing the first scraper comprises urging the first scraper by a spring.

17. The method in accordance with claim 16, wherein the spring has a spring rate of between about 7.5 lb/in and 30 lb/in.

18. The method in accordance with claim 14, wherein biasing the first scraper comprises maintaining abrasive engagement of the first scraper against the coating as the coating is removed from the at least one of the surface and the fastener head.

19. The method in accordance with claim 14 further comprising:
   configuring at least one of the first scraper and the second scraper to be operable for engagement with a power tool; and
   operating the power tool to rotate the first scraper and the second scraper.

20. The method in accordance with claim 14, wherein rotating the second scraper comprises removing the coating from a surface of the recess that opposes an open end thereof.

* * * * *